July 4, 1939.  H. A. COURMETTES  2,165,131
BIPLANAR OPHTHALMIC LENS DIE
Filed June 24, 1938
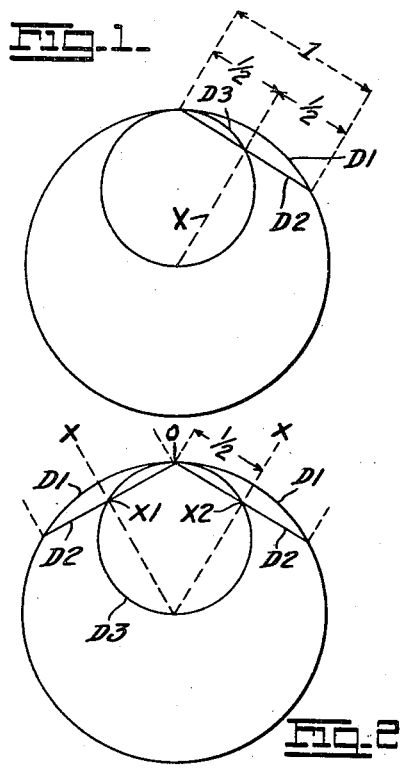
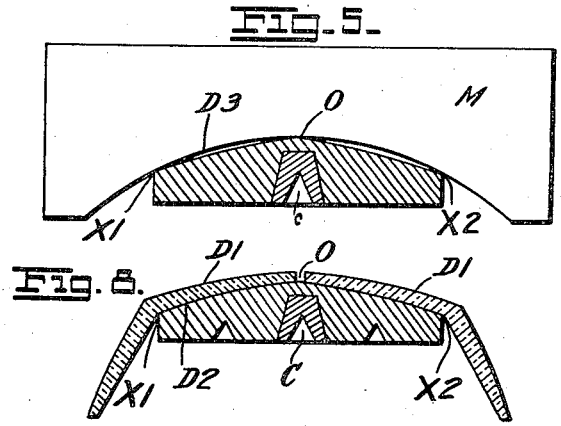
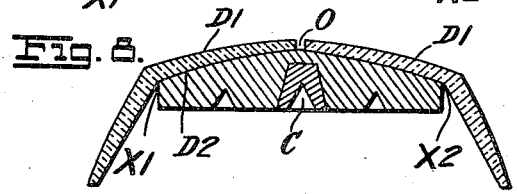
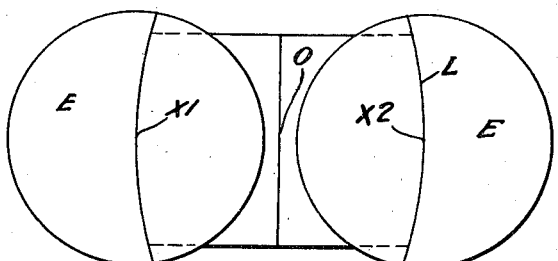
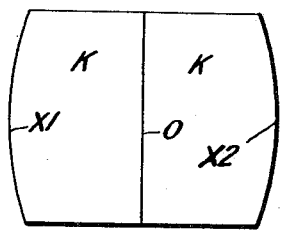
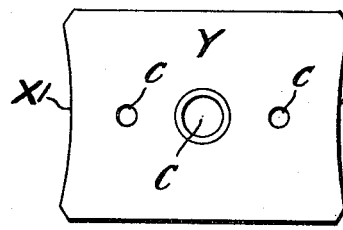
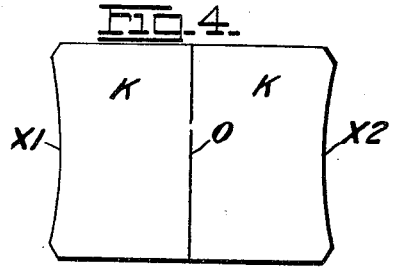
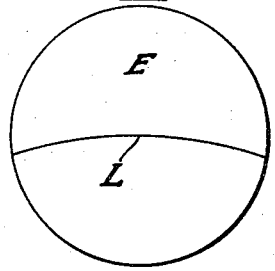
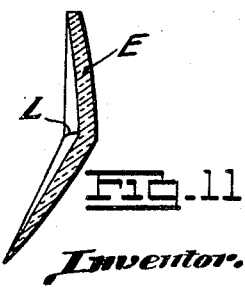
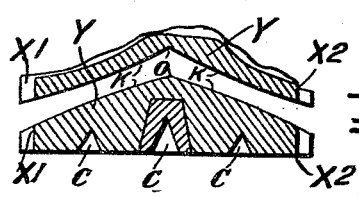
Inventor.
Henry A. Courmettes Patented July 4, 1939

2,165,131

UNITED STATES PATENT OFFICE 2,165,131

BIPLANAR OPHTHALMIC LENS DIE

Henry A. Courmettes, Brooklyn, N. Y.

Application June 24, 1938, Serial No. 215,646

4 Claims. (Cl. 51—216)

My invention relates primarily to the surfacing of the outer surfaces of biplanar ophthalmic lenses such as described in U. S. Patent #1,991,544. The difficulties in grinding these surfaces correctly in the orthodox single lens process, brought about by the necessity of individual calculations for lens thicknesses at various points of their edges, and the correct centering of pivotal centers of lens blocks to which the lenses are secured, have been overcome by my new lens dies which simplify the surfacing operation and result in precise and rapid work.

To more completely understand the function of these lens dies, I am describing the geometric principle which brought their conception, the application of the principle to their construction, the description of their use, the rules for lens and gauge computations, formulas etc.

References are made to the drawing which forms a part of the invention and in which:

Fig. 1 is a drawing of the geometric principle.

Fig. 2 is a drawing of the geometric principle extended to show its application to ophthalmic lens dies.

Fig. 3 is a face view of the lens die showing its two surfaces and a form of edges corresponding to the arc shape of the near vision portion of the lenses and used in their grinding.

Fig. 4 is a face view of the lens die showing its two surfaces and a form of edges corresponding to the arc shape of the distant vision portion of the lenses and used in their grinding.

Fig. 5 is a face view of the testing gauge and a sectional side view of the die, in combination, showing the application of the testing process by the three point contact of die to the curvature of gauge.

Fig. 6 is a sectional side view of Fig. 4.

Fig. 7 is a back side view of Figs. 4 and 6.

Fig. 8 is a sectional side view of two lenses in position on a lens die, in the process of surfacing their continuous outer surfaces, clearly showing optical effects obtained by curves, angles and abutting edges.

Fig. 9 is a face view of Fig. 8 in position for surfacing the lower, or near vision, portion of the lenses.

Fig. 10 is a face view of a biplanar lens showing its curved line of demarcation across its center.

Fig. 11 is a sectional side view of Fig. 10 showing the angle at the line of demarcation used to rest against the guiding curved edges of the dies.

Beginning with the geometric principle sketched herein and explained below, extending and adapting it to the process of computing and measuring angular surfaces of dies for ophthalmic lenses, I produce a most practical and accurate method for surfacing the outer surfaces of biplanar lenses.

I state this principle thus:

"When two circles, having different diameters, one exactly twice that of the other, are placed together with the smaller entirely contained within the larger, tangent to it on one side and intersecting its center of radius on the other, a straight line drawn from the point of tangency of the two circles to any other point on the larger circle is bisected at exactly one half of its length by the smaller circle."

The following terms are used to name the various optical factors and wherein the curvatures and powers are expressed in dioptric values:

D1=outer surface curvature.
D2=inner surface curvature.
D3=curvature of gauge for measuring angular form of dies.
R=R$x$ power of lens.
$t$=thickness of glass in millimeters.
$n$=refraction index of glass.
O=center point of gauge contact at center line of die.
X1=outer point of gauge contact, arched edge line of die.
X2=outer point of gauge contact juxtaposed to X1.
X=optical axes.

When these terms are applied to the geometric principle on Fig. 1, then,

D1=the curvature of the large circle.
D2=the straight line, or co-linear chords of both circles.
D3=the curvature of the small circle, and this sketch proves the principle by showing D2 bisected at exactly one half of its length by D3.

Now, by extending the principle to that shown in Fig. 2, which is actually a doubling of the original principle, I obtain the condition mainly used in my methods, namely; a three point measuring process for dies and gauges. In this sketch, by using the same point of tangency O, the two straight lines D2 are seen to be at an angle to each other and bisected at O, X1, X2 by the circle D3.

Assuming that the two lines D2 represent the inner surfaces of two plano-convex optical lenses while in the angular position shown in Fig. 2, a continuous curve D1, with a common center, could be surfaced over both lenses which would then represent their outside surfaces; the optical axes X traversing the lenses at X1 and X2, as shown, would correspond with the centers of the lines D2 and the geometric center of each lens. Assuming, further, that the lenses are supported by a solid holder extending from X1 to X2 in length and placed against the lines D2 with its two surfaces inclined to follow the angular form X1 to O and O to X2, then, a form for this said holder, herein also called die, would be obtained whereby its edges at X1 and X2 and its center at O would lie on the curve of the small circle D3 the radius of which would simply be one half that of the outside surfaces D1.

It follows, then, that it becomes possible to obtain a controllable angle of die surfaces and also a guide to control the position of the lenses on the die relative to the desired location of optical centers and from this evolves the process of making dies with angular faces and of such contours to hold two biplanar lenses in a relative position during the surfacing operation; D3 then becomes the indispensable measuring tool and from it depends the accuracy of the dies to produce the lenses they are intended for.

I prefer to shape these dies as in Figs. 3, 4, where their edges at X1 and X2 correspond with the arc shape of the dividing line of biplanar lenses and act as a perfect fitting guide for securing the lenses to the die. The edges X1, X2 of Fig. 3 conform to the biplanar lens arc of the lower portion of the lens and Fig. 4 to that of the upper portion.

I am aware that other shapes of edges could accomplish the same result, such as a triangular edge, etc., but the perfect arc is by far the best for accuracy, measuring ease, wear, protection of lens surfaces and other important advantages.

As is understood from the above descriptions, the process of measuring dies in this method is arrived at by obtaining a simultaneous contact of the three points X1, O, X2 with the curve of the gauge intended for them. This is done directly on dies intended for plus power lenses and on matrix molds for minus lenses. The surfaces of these dies are ground and smoothed to correspond with the lens surface curvatures; this is important as unless a perfect and even contact is made between them, the resultant would be incorrect.

Consideration must be given to lenses which have other than flat inner surfaces, thicknesses of lenses, powers, optical center, etc., this involves computing the various factors entering each condition, but the method remains the same for all of them.

The following examples are given as general rules to compute the various elements according to their particular factors and to provide a method to obtain angular relation of the surfaces in the making of the dies, the invention however is not confined solely to the method described but may use any mathematical or instrumental means and methods known. In Examples 1 and 2 the optical centers of the lenses are calculated to coincide with X1 and X2, R represents the total $Rx$ power in the vertical meridian, and $t$ equals the thickness of glass required by $Rx$ power itself for a lens having a diameter twice that of die surface, i. e., X1 to 0×2. In Example 3, D3 is the resultant combination of that found by Formulas 1 or 2 together with the equation for vertical decentration, in which B is expressed in millimeters.

1. If, as is commonly known in optical parlance, marked power tools are used in the computations, then D3 should include the effective power of lens thickness, thus:

$$D3 = (+D2) \times \left(\frac{t}{n-1. \div D1}\right) + D1 + R$$

then $$D2 = R - D1$$

and $$D1 = R - D2$$

2. If vertex effective power of $Rx$ is wanted, 1.523 being the index of glass and 1.530 the index of tools ordinarily used in the manufacture of ophthalmic lenses, then the computations become this:

$$D1 = \frac{R - \left(D2 \div \frac{530}{523}\right)}{1. + \left(R - \left[D2 \div \frac{530}{523}\right] \times \frac{t}{1000 \times 1.523}\right)}$$

$$D2 = R - \frac{D1}{1. - \left(D1 \times \frac{t}{1000 \times 1.523}\right)}$$

$$D3 = (+D2) \times \frac{530}{523} \times \left(\frac{t}{n-1. \div \left[D1 \times \frac{530}{523}\right]}\right) + \left(D1 \times \frac{530}{523}\right) + R$$

$$R = D2 + \frac{D1}{1. - \left(D1 \times \frac{t}{1000 \times 1.523}\right)}$$

and the tool power for D1 and D2 is obtained by multiplying same by $$\frac{530}{523}$$

3. Vertical decentration, or equivalent prism power is obtained from the simple formula, $$D3 = D3 - \left(\frac{A}{B} \times [D3 + D2]\right)$$

or $$D3 + \left(\frac{A}{B} \times [D3 + D2]\right)$$

according to the respective, up or down, direction of decentration and where,

A = Decentration in m/m
B = One half diameter of individual surfaces of die.

Lateral decentration is measured by hand calipers as in the ordinary single lens process.

4. Where the thickness of plus lenses at O, or minus lenses at X1 X2 is appreciable, the radius of D3 should be shortened by a similar length.

Referring to the drawing, in Figs. 5, 8, 9, the method of making the dies consists in lapping their two angular faces K to conform with the lens surface curvatures D2 and at such angle to each other that, in line with the center of the die, their edges X1, X2 and the center line of joinder O form a three point simultaneous contact with the predetermined spherically curved edges D3 of gauge M, and lapping, or shaping, the edges X1, X2 of said dies to fit the arc shaped inner demarcation line L of biplanar lenses E, and providing the reverse side with suitable pivotal centers C, or connections adaptable to surfacing mechanism in use.

I prefer to make these dies with a hard but light metal such as duraluminium for better ease in working and handling, and the gauges, as ordinarily made, in brass.

I am aware that my lens dies may be made of varied shapes and in composite form without changing their principle and effect, therefore I am not confining my claims to the exact forms sketched but also to others using my method of measuring and accomplishing the same result.

The word die has been used herein instead of holder, block, etc. common in lens making, to befit the function and precision of the new device without prejudice to its otherwise named useful applications.

I know that lens blocks have been made in various forms for multiple lens grinding, but I do not believe, the art of biplanar lenses being new, that a precise lens die made to hold two such lenses in a relative angular position and at the same time fitting their arc shaped dividing line has ever been made before my invention thereof, nor my method of measuring them, therefore

I claim as new:

1. A die for blocking ophthalmic lenses in the process of surface grinding comprising, on one side, two angularly disposed and lapped surfaces evenly joined in a line at its center, two juxtaposed edges curved to fit the inner line of demarcation in biplanar lens surfaces and guide the positioning of said lenses upon the said die, whereby the curved edges and the line of junction of the two surfaces at the center of said die lie on a predetermined curve, and suitable pivotal centers on the opposite side of said die.

2. A die for blocking ophthalmic lenses in the process of surface grinding comprising, on one side, two angularly disposed and lapped surfaces evenly joined in a line at its center, two juxtaposed edges shaped to fit and abut against the inner line of demarcation in biplanar lens surfaces and guide the positioning of said lenses upon the said die, whereby the said edges and the line of junction of the two surfaces at the center of said die lie on a predetermined curve, and on its opposite side, suitable form adaptable to surfacing mechanism.

3. A device to aid in surfacing the outer surfaces of biplanar ophthalmic lenses consisting of a member formed to hold two such lenses in a stationary and predetermined relative angular position, to serve as fixed guide in positioning said lenses upon the said device by contact with the inner line of demarcation in biplanar lens surfaces, to provide the feature whereby the said relative angular position may be measured with curvature gauges, and be adaptable to surfacing mechanism, as set forth.

4. A device to aid in finishing the outer surfaces of biplanar ophthalmic lenses consisting of a solid member formed to include, on one side thereof, features to hold two such lenses in a stationary and predetermined relative angular position whereby in the surfacing process a desired form is imparted to said lenses controlling the angular relation of their surfaces and location of their optical centers, features serving as fixed guides in positioning the said lenses upon the said device by contact with the inner line of demarcation in biplanar lens surfaces, and a feature whereby the said relative angular position may be measured with curvature measuring tools; on the reverse side thereof, adaptability to surfacing mechanism in use.

HENRY A. COURMETTES.